US012674440B2

(12) United States Patent
Simon et al.

(10) Patent No.: US 12,674,440 B2
(45) Date of Patent: Jul. 7, 2026

(54) MONITORING AND MANAGING A GEOTHERMAL ENERGY SYSTEM

(71) Applicant: Schlumberger Technology Corporation, Sugar Land, TX (US)

(72) Inventors: Matthieu Simon, Clamart (FR); Sarah Asfour, Clamart (FR); Prasanna Amur Varadarajan, Clamart (FR); Sylvain Chambon, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/985,250

(22) Filed: Dec. 18, 2024

(65) Prior Publication Data

US 2025/0207564 A1      Jun. 26, 2025

(30) Foreign Application Priority Data

Dec. 22, 2023      (EP) ..................................... 23307354

(51) Int. Cl.
F03G 4/00        (2006.01)
G06F 18/22      (2023.01)
G06F 123/02    (2023.01)

(52) U.S. Cl.
CPC .............. F03G 4/072 (2021.08); G06F 18/22 (2023.01); G06F 2123/02 (2023.01)

(58) Field of Classification Search
CPC ...... F03G 4/072; G06F 18/22; G06F 2123/02; F24T 2010/56; F24T 2201/00; F24T 10/15; F24T 10/10
See application file for complete search history.

(56) References Cited

U.S. PATENT DOCUMENTS

| | | | |
|---|---|---|---|
| 11,187,212 B1 * | 11/2021 | Bodishbaugh | .......... E21B 47/07 |
| 12,158,138 B2 * | 12/2024 | Taylor | ..................... F03G 7/04 |
| 2011/0220320 A1 | 9/2011 | Kidwell | |
| 2011/0272117 A1 | 11/2011 | Hamstra | |
| 2015/0094989 A1 * | 4/2015 | Collet | ..................... F24T 10/10 |
| | | | 702/188 |
| 2022/0178590 A1 | 6/2022 | Toussaint | |
| 2024/0095429 A1 * | 3/2024 | Hudson | .................. G06Q 50/02 |

FOREIGN PATENT DOCUMENTS

CA            3200344 A1    12/2023

* cited by examiner

*Primary Examiner* — Hoang M Nguyen
(74) *Attorney, Agent, or Firm* — Kyle R. Miiller

(57)            ABSTRACT
A geothermal management system may receive time-series data for operation of the geothermal energy system. A geothermal management system may calibrate a physical model using the time-series data. A geothermal management system may apply the physical model to a pre-determined comparison parameter to generate a performance indicator. A geothermal management system may identify an operating status of the geothermal energy system based on the performance indicator.

18 Claims, 10 Drawing Sheets

574

Measure time-series data over a period of time — 576

Perform calibration of a physical model using the time-series data — 578

Apply the calibration to a pre-determined comparison parameter — 580

Identify an operating status of the geothermal energy system based on a change between performance indicators — 582

MONITORING AND MANAGING A GEOTHERMAL ENERGY SYSTEM

CROSS-REFERENCE TO RELATED APPLICATIONS

This application claims priority to European Patent Application No. 23307354.3, filed on Dec. 22, 2023, the entirety of which is incorporated herein by reference.

BACKGROUND OF THE DISCLOSURE

Geothermal energy is a sustainable energy source that utilizes thermal energy of the earth's crust. Many geothermal energy systems utilize a wellbore drilled in the crust to a depth where the temperature of the surrounding formation is relatively constant. Fluid may be passed into the wellbore and a thermal exchange between the fluid may provide the energy for the geothermal energy system.

A geothermal energy system includes one or more pieces of equipment, including pumps, compressors, heat exchangers, and so forth. Typically, an operator may monitor operating parameters for the equipment. The operator may identify an operating status based on the measured operating parameters. But such an operator may be specialized, which may increase monitoring costs.

SUMMARY

In some aspects, the techniques described herein relate to a method for monitoring a status of a geothermal energy system. A geothermal management system receives time-series data for operation of the geothermal energy system. The geothermal management system calibrates a physical model using the time-series data. The geothermal management system applies the physical model to a pre-determined comparison parameter to generate a performance indicator. The geothermal management system identifies an operating status of the geothermal energy system based on the performance indicator.

In some aspects, the techniques described herein relate to a method for monitoring a status of a geothermal energy system. A geothermal management system measures a first set of time-series data over a first period of time for operation of the geothermal energy system. The geothermal management system performs a first calibration of a physical model using the first set of time-series data. The geothermal management system applies the first calibration of the physical model to a pre-determined comparison parameter to generate a first performance indicator. The geothermal management system measures a second set of time-series data over a second period of time for the operation of the geothermal energy system. The geothermal management system performs a second calibration of the physical model using the second set of time-series data. The geothermal management system applies the second calibration of the physical model to the pre-determined comparison parameter to generate a second performance indicator. The geothermal management system identifies an operating status of the geothermal energy system based on a change between the first performance indicator and the second performance indicator.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-2 is a representation of a heat pump system of the geothermal energy system of FIG. 1-1;

FIG. 2 is a schematic representation of a geothermal management system, according to at least one embodiment of the present disclosure;

FIG. 3-1 through FIG. 3-4 are graphical representations of a geothermal management system, according to at least one embodiment of the present disclosure;

FIG. 4 is a flowchart of a method for managing a geothermal energy system, according to at least one embodiment of the present disclosure;

DETAILED DESCRIPTION

This disclosure generally relates to devices, systems, and methods for monitoring and managing a geothermal energy system. The geothermal energy system may include a heat-exchange system embedded in an underground formation. The underground formation may have a constant or a relatively constant temperature. A working fluid may be flowed underground, where the working fluid may exchange heat with the material in the underground formation. This heat exchange may be used to generate power, heat, and/or cool a facility, for instance, using a ground source heat pump.

The energy control system may include one or more pieces of equipment. For example, the energy control system may include one or more compressors, heat pumps, heat exchangers, turbines, working fluid pumps, any other pieces of equipment, and combinations thereof. The status of the equipment may impact the operation of the geothermal energy system. For example, if a certain unit of equipment is damaged and/or operating with a lower efficiency, then the efficiency of the geothermal energy system may be reduced.

In accordance with at least one embodiment of the present disclosure, the geothermal management system measures and/or monitors time-series operational data for the geothermal energy system. The energy control system may use the operational data to calibrate a physical model and apply the calibrated model to a comparison parameter to generate a performance indicator. The performance indicator may be used to determine an operating status of the geothermal energy system. For example, the performance indicator may identify that one or more pieces of the equipment may be out of calibration and/or in need of maintenance. The geothermal management system may, based on the operating status, adjust an operating parameter of the geothermal energy system to return the system to within a threshold. This may help to improve the identification of issues within the geothermal energy system, thereby allowing the operator to return the system to within the operating threshold. This may improve the efficiency of the geothermal energy system and reduce the associated operating costs.

Figure 1:
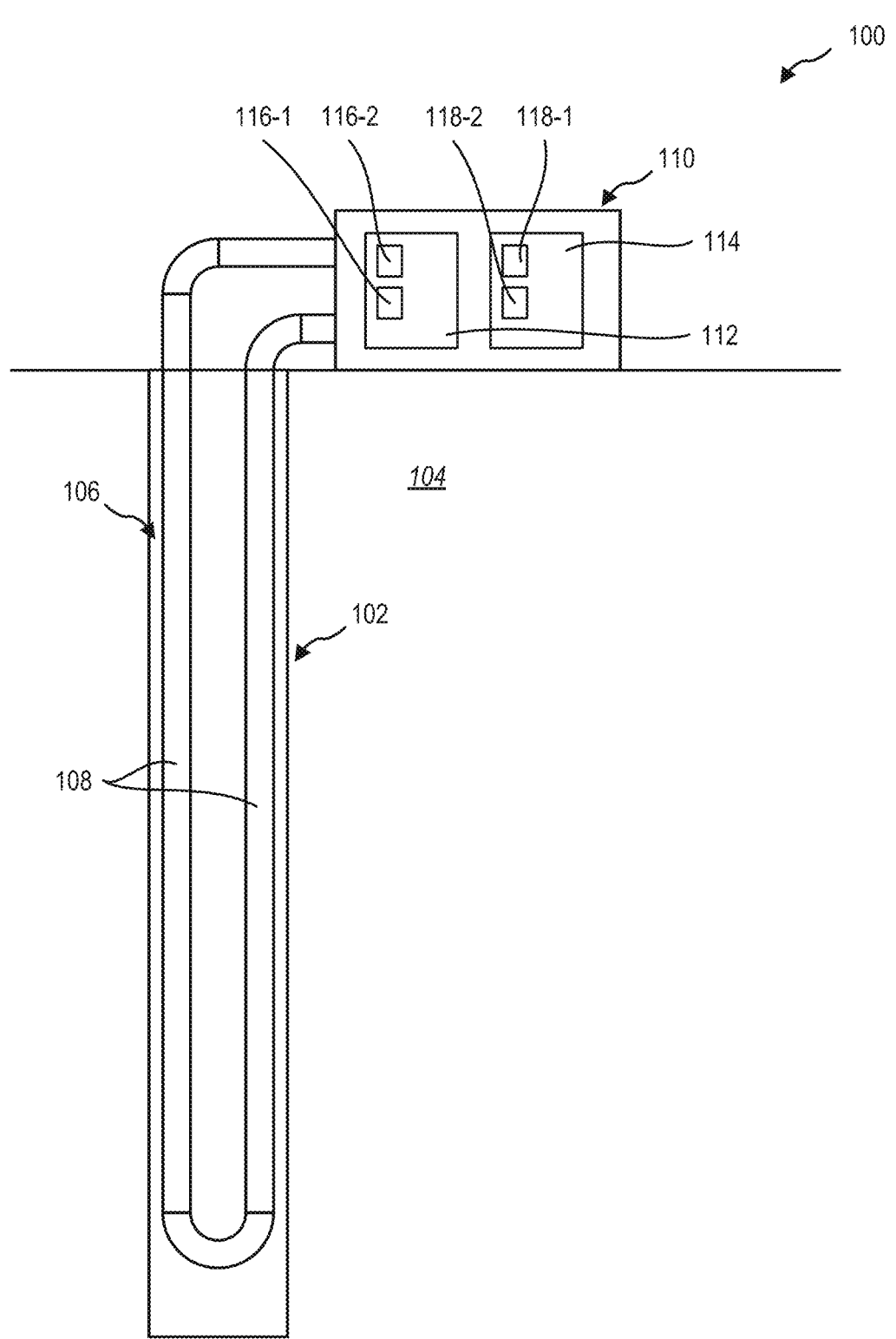
FIG. 1-1 is a representation of a geothermal energy system, according to at least one embodiment of the present disclosure.

FIG. 1-1 is a representation of a geothermal energy system 100, according to at least one embodiment of the present disclosure. The geothermal energy system 100 includes a wellbore 102 drilled in a formation 104. A heat exchange system 106 may be inserted into the wellbore 102. The heat exchange system 106 may include one or more pipes 108. The pipes 108 may provide a path for a downhole fluid to pass into and out of the wellbore 102. The downhole fluid may exchange heat with the formation 104 through the wellbore 102. For example, the downhole fluid may be colder than the formation 104, and the formation 104 may provide heat to warm the downhole fluid. The warmed downhole fluid may then pass out of the wellbore 102 and into a processing system 110. In some embodiments, the downhole fluid is warmer than the formation 104, and the downhole fluid passes heat into the formation 104. The cooled downhole fluid may then pass out of the wellbore 102 and into the processing system 110.

The processing system 110 may process the warmed or cooled downhole fluid to capture the thermal energy stored therein. For example, the processing system 110 may include one or more heat exchangers and/or heat pumps. If the downhole fluid is warmed by the formation 104, the heat exchangers may absorb at least a portion of the thermal energy in the downhole fluid to generate power and/or provide heat for a heating system. If the downhole fluid is cooled by the formation 104, the heat exchangers may transfer heat to the downhole fluid to cool air and/or fluid for a cooling system. In this manner, the processing system 110 may process the downhole fluid utilizing the thermal energy from the formation 104.

The processing system 110 of the geothermal energy system 100 may include equipment. The equipment may include any type of equipment. For example, the equipment may include heat exchange equipment 112. The heat exchange equipment 112 may include compressors, heat exchangers, heating coils, cooling coils, turbines, evaporators, condensers, any other heat exchange equipment [112], and combinations thereof. The heat exchange equipment 112 may be used to facilitate the thermal energy exchange with the formation 104 through downhole fluid. The equipment may further include fluid handling equipment 114. The fluid handling equipment 114 may include pumps, turbines, fluid storage tanks, any other fluid handling equipment, and combinations thereof.

Figures 1, 2:
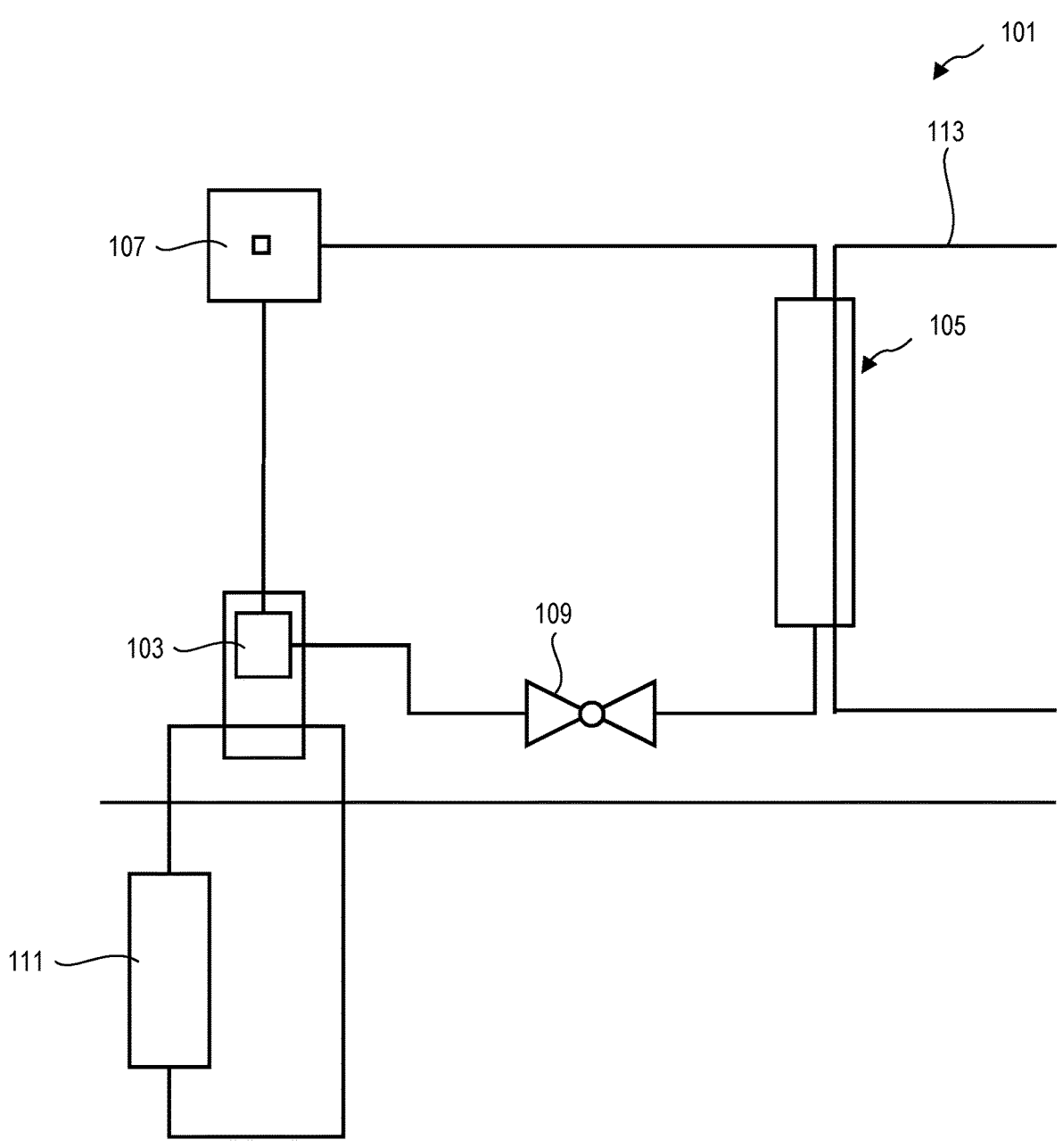
Figure 2:
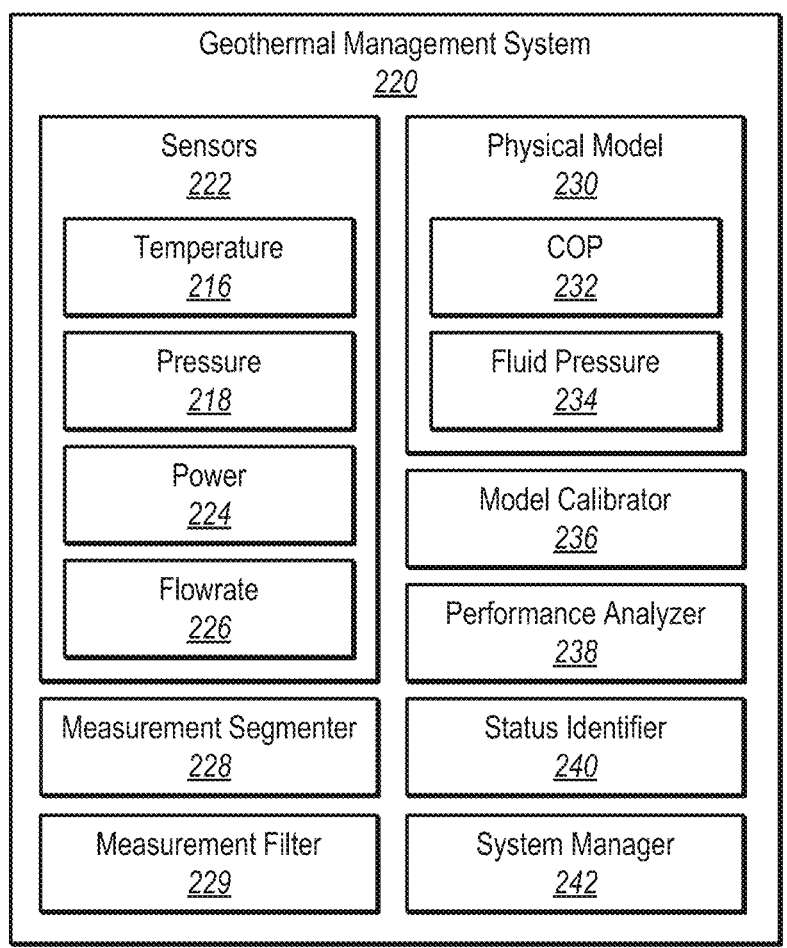

The processing system 110 For instance, in an embodiment, the processing system includes a heat pump. FIG. 1-2 illustrates a heat pump system 101 that may be implemented in the geothermal energy system 100 of FIG. 1-1. The heat pump system 101 includes a first heat exchanger 103 for exchanging heat between the downhole fluid circulating between the geological formation (and borehole heat exchanger 111) and the first heat exchanger and a refrigerant (or working fluid) and a second heat exchanger 105 for exchanging heat between the refrigerant and the building fluid of the heating and/or cooling system of the facility (such as water or air). The second heat exchanger 105 may be connected to a building heating circuit 113 which may be used to heat and/or cool the building. The heat pump system 101 also includes a compressor 107 and an expansion valve 109. If the heat pump system works in a heating mode, the refrigerant is heated by the working fluid in the first heat exchanger 103 (in the heating mode, the first heat exchanger 103 is an evaporator) and vaporizes. The refrigerant is then compressed by the compressor 107, raising its temperature in the process. The compressed vaporized refrigerant provides heat to the building fluid through the second heat exchanger 105 (in the heating mode, the second heat exchanger 105 is a condenser) and is decompressed via the expansion valve 109 to take once again its liquid decompressed state. In the cooling mode, the refrigerant is heated by the building fluid in the second heat exchanger 105 (in the cooling mode, the second heat exchanger 105 is an evaporator) and vaporizes. The vaporized refrigerant is then compressed by the compressor 107, and directed to the first heat exchanger 103 (in the cooling mode, the first heat exchanger 103 is a condenser) to provide heat to the working fluid through the first heat exchanger 103 and is decompressed via the expansion valve 109. To enable both the heating and cooling mode, the working fluid circuit generally includes a reversible valve as is known to from the one of ordinary skill (not shown here) for clarity purposes.

The geothermal energy system 100 may include one or more sensors. For example, the geothermal energy system 100 may include a temperature sensor (collectively 116). When there is a heat pump, the temperature sensors 116 may include a first heat exchanger temperature sensor 116-1 and a second heat exchanger temperature sensor 116-2. The first heat exchanger temperature sensor 116-1 may measure the temperature of the working fluid at the outlet of the first heat exchanger. The second heat exchanger temperature sensor 116-2 may measure the temperature of the working fluid at the outlet of the second heat exchanger. The difference between the measured temperature from the temperature sensor 116-1 and the temperature sensor 116-2 may be delta T, or the change in temperature. Depending on the heat pump mode, the difference may be positive or negative, but for the remainder, the absolute value of the temperature may be considered.

In some embodiments, the temperature sensors 116 include temperature sensors at the heat exchange equipment 112 to measure parameters relative to the heat exchange equipment. In some embodiments, the temperature sensors 116 are located at any location in the geothermal energy system 100 to measure parameters relative to other elements of the geothermal system, such as the borehole heat exchanger. For example, the temperature sensors 116 may be located at the inlet, the outlet, in the wellbore 102, at any other location, and combinations thereof. The temperature sensors 116 may be placed in locations other than the heat exchange equipment 112 for ease of placement, access, measurement, and so forth.

The geothermal energy system 100 may further include power monitoring sensors. For example, the geothermal energy system 100 may include a sensor that monitors the power of the compressors in the heat exchange equipment 112. In some examples, the geothermal energy system 100 includes a sensor that identifies which compressors are operating. In some embodiments, the geothermal energy system 100 includes a thermal energy sensor that monitors the amount of thermal energy produced by the heat exchange equipment 112. In some embodiments, the geothermal energy system 100 includes a flowrate sensor on the fluid handling equipment 114 to determine the flowrate of the working fluid. In some embodiments, the geothermal energy system 100 includes a pressure sensor on the fluid handling equipment 114 to determine the pressure drop across the fluid handling pumps.

The geothermal energy system 100 may further include pressure sensors (collectively 118). The pressure sensors 118 may include an inlet pressure sensor 118-1 and an outlet pressure sensor 118-2 to measure parameters relative to the borehole heat exchanger. The inlet pressure sensor 118-1 may measure the pressure at the inlet of the downhole fluid to the wellbore 102. The outlet pressure sensor 118-2 may measure the pressure at the outlet of the downhole fluid to the wellbore 102. The difference in pressure measurements between the inlet pressure sensor 118-1 and the outlet pressure sensor 118-2 may be the pressure differential.

In some embodiments, the pressure sensors 118 include pressure sensors at the heat exchange equipment 112 and/or the fluid handling equipment 114 to measure parameters relative to said equipment. In some embodiments, the pressure sensors 118 are located at any other location in the geothermal energy system 100.

The sensors of the geothermal energy system 100 may monitor the operating parameters (e.g., pressure, temperature, compressor power, thermal energy) of the processing system 110 and/or the other elements of the geothermal energy system 100. The sensors may measure the operating parameters periodically and/or episodically. For example, the sensors may measure the operating parameters periodically with a measurement frequency. The measurement frequency may include an upper bound, a lower bound, or upper and lower bounds that may include any of 1 measurement per day, 2 measurements per day, 5 measurements per day, 1 measurement per hour, 0.001 Hz, 0.01 Hz, 0.1 Hz, 0.5 Hz, 1 Hz, 5 Hz, 10 Hz, 50 Hz, 100 Hz, 500 Hz, 1 kHz, any other frequency, and combinations thereof. In some embodiments, the sensors measure one or more of the operating parameters episodically based on one or more pre-determined events. For example, the sensors may measure one or more of the operating parameters based on the startup of a piece of equipment, the status of an environmental sensor (e.g., ambient temperature, weather conditions), based on a use-status of the equipment, any other pre-determined event, and combinations thereof.

In accordance with at least one embodiment of the present disclosure, a geothermal management system monitors one or more performance parameters based on the measurements. A performance parameter may be a calculated and/or measured parameter for a status of the geothermal energy system 100. The performance parameter may be any parameter. For example, for a heat exchange system such as a heat pump, the performance parameter may include a coefficient of performance (COP). The COP may be a representation of the ratio between the thermal energy transfer (Q) and the electric energy (W) of the heat exchanger to affect the thermal energy transfer. The COP may be expressed as:

$$COP = \frac{Q}{W} \qquad \text{Eq. 1}$$

As a specific, non-limiting example, a COP of 4 is interpreted as, for each unit of electric energy consumed, 4 units of thermal energy are produced.

The geothermal energy Both Q and W may be approximated as a function of the evaporator temperature and the condenser temperature. This may allow the COP to be expressed as a function of the differential temperature, or delta T (dT, i.e., the change in temperature delta T as described hereinabove). As a specific, non-limiting example, the COP may be expressed as a polynomial function:

$$COP = COP_0 + COP_1 dT + COP_2 dT^2 \qquad \text{Eq. 2}$$

While Eq. 2 has been expressed as a second-degree polynomial equation, it should be understood that the COP may be expressed as any other function of dT, Q, W, or any other parameter. For example, Eq. 2 may be expressed as a polynomial function having any degree (e.g., first (linear), second, third, fourth, fifth, sixth, seventh, eighth, ninth, tenth), exponential, hyperbolic, any other function, and combinations thereof.

While the performance parameter discussed above is the COP, it should be understood that any performance parameter may be monitored and/or determined in relationship with any equipment of the geothermal system. For example, the performance parameter may include the pressure differential with respect to the flowrate of the working fluid to determine a performance parameter of the borehole heat exchanger.

The performance parameter may be determined using a physical model. For example, the physical model may be a model of the COP with respect to the differential temperature, as expressed by Eq. 2. The coefficients COP0, COP1, and COP2 of the physical model may be determined based on multiple measurements of Q and/or W and/or dT. In this manner, the physical model may be calibrated for a period of time using time-series measurements over that period of time.

Using the calibration, a performance indicator for the period of time may be calculated. For example, the coefficients of Eq. 2 may be determined during calibration. The COP for the period of time may be calculated using the calibrated Eq. 2 and a pre-determined dT (e.g., a predetermined comparison parameter). This performance-indicating COP may be compared with other COPs calculated from the same predetermined temperature difference $dT_0$ (with coefficients calibrated using the measurements during other time periods) to identify an operating status of the geothermal energy system 100.

In some embodiments, the time-series data is split into multiple time segments. The physical model may be calibrated for each time segment. The geothermal management system may determine a performance indicator for each time segment. For example, the geothermal management system may calibrate the physical model for each of the time segments using the time-series data measured during the time segment. The geothermal management system may calculate the performance indicator for each calibrated model. Each performance indicator may be calculated using the same pre-determined comparison parameter. The comparison parameter may be a pre-determined parameter, such as dT, a pressure differential, or another pre-determined parameter. The geothermal management system may identify the operating status of the geothermal energy system using the performance indicators. For example, the geothermal management system may identify the operating status of at least a component of the geothermal energy system using a change in the performance parameters. In this manner, the geothermal management system may automatically identify changes in the operating status of at least a component of the geothermal energy system and adjust one or more operating parameters of the geothermal energy system and/or maintain said component. This may improve the efficiency and/or effectiveness of the geothermal energy system.

In accordance with at least one embodiment of the present disclosure, the operator may identify the operating status based on a comparison between at least two of the performance indicators. For example, the operator may identify the operating status based on a slope of a rate of change of a plurality of performance indicators. In some examples, the operator may identify the operating status based on a ratio of two performance indicators. In some examples, the operator may identify the operating status based on an absolute value of at least one performance indicator. For example, if the COP drops below a value of 2, then the operator may identify that at least one component of the geothermal energy system is damaged and/or ready for calibration.

The operating status may be a representation of the condition in which the geothermal energy system is operating. For example, the operating status may be a representation of the power efficiency of the geothermal energy system. In some examples, the operating status is a representation of the equipment maintenance status of the geothermal energy system. In some examples, the operating status is a representation of the amount of heat exchange taking place by the heat exchanger.

FIG. 2 is a schematic representation of a geothermal management system 220, according to at least one embodiment of the present disclosure. Each of the components of the geothermal management system 220 can include software, hardware, or both. For example, the components can include one or more instructions stored on a computer-readable storage medium and executable by processors of one or more computing devices, such as a client device or server device. When executed by the one or more processors, the computer-executable instructions of the geothermal management system 220 can cause the computing device(s) to perform the methods described herein. Alternatively, the components can include hardware, such as a special-purpose processing device to perform a certain function or group of functions. Alternatively, the components of the geothermal management system 220 can include a combination of computer-executable instructions and hardware.

Furthermore, the components of the geothermal management system 220 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

The geothermal management system 220 may monitor one or more operating parameters of the geothermal energy system. For example, the geothermal management system 220 may include one or more sensors 222. The sensors 222 may be positioned and/or located to measure various operating parameters of the geothermal energy system. The sensors 222 may include any type of sensor. For example, the sensors 222 may include one or more temperature sensors 216. The temperature sensors 216 may include an evaporator temperature sensor to measure the evaporator temperature of a heat pump, a condenser temperature sensor to measure the condenser temperature of said heat pump, an inlet temperature sensor to measure the temperature of the downhole fluid at the wellbore inlet, an outlet temperature sensor to measure the temperature of the downhole fluid at the wellbore outlet, any other temperature sensor, and combinations thereof.

The sensors 222 may further include one or more pressure sensors 218. The pressure sensors 218 may measure the pressure of a fluid, such as the downhole or the working fluid, at any location in the system. For example, the pressure sensors 218 may include an evaporator pressure sensor to measure the evaporator pressure, a condenser pressure sensor to measure the condenser pressure, an inlet pressure sensor to measure the pressure of the downhole fluid at the wellbore inlet, an outlet pressure sensor to measure the pressure of the downhole fluid at the wellbore outlet, any other pressure sensor, and combinations thereof.

The sensors 222 may further include one or more power sensors 224. The power sensors 224 may measure the power of the heat exchanger equipment. For example, the power sensors 224 may measure the power consumed by the pumps to pump the working fluid, the power consumed by the compressors of the heat exchanger, the power of the auxiliary system of the heat exchanger, the total power of the heat exchanger, and combinations thereof. In some embodiments, the power sensors 224 measure the power consumed by individual components of the heat exchanger. In some embodiments, the power sensors 224 measure the total power consumed by the heat exchanger. In some embodiments, the power sensors 224 measure the total power consumed by the geothermal energy system. For example, the power sensors 224 are located at the inlet power line to the entire geothermal energy system, the inlet power line to the heat exchanger, the inlet power line to the individual components of the geothermal energy system, the individual components of the heat exchanger, any other location, and combinations thereof.

The sensors 222 may further include one or more flowrate sensors 226. The flowrate sensors 226 may measure the flowrate of the working fluid through the geothermal energy system. For example, the flowrate sensors 226 may measure the flowrate of the downhole fluid through the wellbore, at the inlet of the wellbore, the outlet of the wellbore, any other location of the geothermal energy system, and combinations thereof.

As discussed herein, the sensors 222 may measure time-series data of the various operating parameters of the geothermal energy system. For example, each measurement may be associated with a time-stamp indicative of the time that the measurement was taken.

The geothermal management system 220 may further include a measurement segmenter 228. The measurement segmenter 228 may segment the measurements from the sensors 222 into one or more time segments. A time segment may include a period of time over which measurements of operating parameters were made. In some embodiments, different time segments at least partially overlap. In some embodiments, different time segments have the same duration. In some embodiments, different time segments have different durations. In some embodiments, different time segments have the same start time. In some embodiments, different time segments have different start times. In some embodiments, different time segments have the same end time. In some embodiments, different time segments have different end times.

In some embodiments, a measurement filter 229 filters the measurements from the sensors 222. The filter may filter the measurements to result in steady-state measurements for the operating parameters. The measurement filter 229 may filter the time-series data to a steady-state status. For example, the filter may discard measurements that are taken during a ramp-up and/or a ramp-down period for the equipment of the heat exchanger. In some examples, the filter discards outlier measurements. In some examples, the filter discards measurements taken during transition periods, such as periods in which different pieces of equipment are turned on and/or off during operation of the heat exchanger.

In some embodiments, the time segment duration is in a range having an upper value, a lower value, or upper and lower values including any of 1 min., 10 min., 30 min., 1 hour, 2 hours, 6 hours, 12 hours, 1 day, 2 days, 4 days, 1 week, 2 weeks, 3 weeks, 1 month, 2 months, 3 months, 4 months, 6 months, 1 year, or any value therebetween. For example, the time segment duration may be greater than 1 min. In another example, the time segment duration may be less than 1 year. In yet other examples, the time segment duration may be any value in a range between 1 min. and 1 year. In some embodiments, it is critical that the time segment duration is approximately 1 month to identify changes in the operating status of the geothermal energy system. Adjusting the time segment duration may help to identify the operating status of the geothermal energy system with different levels of granularity. For example, a shorter time segment duration may identify changes to the operating status in greater granularity, and a longer time segment duration may identify longer-term trends in the change to the operating status.

The start time of different time segments may be offset with a start time offset. In some embodiments, the start time offset is in a range having an upper value, a lower value, or upper and lower values including any of 1 min., 10 min., 30 min., 1 hour, 2 hours, 6 hours, 12 hours, 1 day, 2 days, 4 days, 1 week, or any value therebetween. For example, the start time offset may be greater than 1 min. In another example, the start time offset may be less than 1 week. In yet other examples, the start time offset may be any value in a range between 1 min. and 1 week. In some embodiments, it is critical that the start time offset is approximately 1 day to identify changes in the operating status of the geothermal energy system. Adjusting the start time offset may help to identify the operating status of the geothermal energy system with different levels of granularity. For example, a shorter start time offset may identify changes to the operating status in greater granularity, and a longer start time offset may identify longer-term trends in the change to the operating status.

The end time of different time segments may be offset with an end time offset. In some embodiments, the end time offset is in a range having an upper value, a lower value, or upper and lower values including any of 1 min., 10 min., 30 min., 1 hour, 2 hours, 6 hours, 12 hours, 1 day, 2 days, 4 days, 1 week, or any value therebetween. For example, the end time offset may be greater than 1 min. In another example, the end time offset may be less than 1 week. In yet other examples, the end time offset may be any value in a range between 1 min. and 1 week. In some embodiments, it is critical that the end time offset is approximately 1 day to identify changes in the operating status of the geothermal energy system. Adjusting the end time offset may help to identify the operating status of the geothermal energy system with different levels of granularity. For example, a shorter end time offset may identify changes to the operating status in greater granularity, and a longer end time offset may identify longer-term trends in the change to the operating status.

The geothermal management system 220 may include one or more physical models 230. The physical models 230 may include any physical model. For example, the physical models may include a COP model 232, which may model the coefficient of performance of a heat pump of the geothermal system based on a temperature differential, as described above with respect to Eq. 2. The physical models 230 may include a fluid pressure model 234. The fluid pressure model 234 may include a model of downhole fluid pressure circulating in the borehole heat exchanger based on a measured flow rate.

In some embodiments, the physical models 230 include different models for different operating conditions. For example, the COP model 232 may include different models for different numbers of compressors that are operating in the heat exchanger. The COP model 232 may include a first COP for a first operating compressor, a second COP for a second operating compressor, a third COP for two operating compressors, and so forth. Because the type and/or number of compressors operating in the geothermal energy system impacts the power draw, utilizing different COP models 232 for different numbers of compressors may allow for a more precise identification of operating statuses of the geothermal energy system.

The geothermal management system 220 may include a model calibrator 236. The model calibrator 236 may calibrate the physical models 230 using the relevant measurements measured by the sensors 222. For example, the model calibrator 236 may calibrate the COP model 232 using the temperature measurements from the temperature sensors 216 (to determine or infer the thermal energy transfer) and the power measurements from the power sensors 224. The model calibrator 236 may calibrate the fluid pressure model 234 using the pressure measurements from the pressure sensors 218 and/or the flowrate measurements from the flowrate sensors 226.

In accordance with at least one embodiment of the present disclosure, the model calibrator 236 calibrates the physical models 230 for each time segment. For example, the model calibrator 236 may calibrate the physical models 230 using the measurement data measured during the particular time segment. This may result in multiple calibrated models, based on the number of time segments. For example, the model calibrator 236 may generate a calibrated model for each time segment.

The geothermal management system 220 may further include a performance analyzer 238. The performance analyzer 238 may apply a pre-determined comparison parameter to the calibrated physical models 230, resulting in a performance indicator. Utilizing a pre-determined comparison parameter may allow the operator to compare performance indicators using a known parameter, thereby improving the comparison.

As discussed herein, the model calibrator 236 may generate multiple calibrated models based on the physical models 230 for each time segment. In some embodiments, the model calibrator 236 detects an operating condition (e.g., how many and/or which compressors are active). The model calibrator 236 may compare the calibrated model with other calibrated models that are based on the same operating condition. The performance analyzer 238 may generate a performance indicator for each calibrated model in each time segment. This may result in multiple performance indicators, each performance indicator indicative of the operating status of the geothermal energy system.

A status identifier 240 may analyze the performance indicators to identify an operating status of the geothermal energy system. For example, the status identifier 240 may compare the performance indicator to pre-defined indicators, such as performance indicators or other indicators, such as slope indicators. The pre-defined performance indicators may be associated with certain operating statuses. In this manner, the status identifier 240 may determine the operating status of the geothermal energy system based on the performance indicators. A pre-defined performance indicator may be a fixed value, a value determined as a function of the performance indicators calculated at a certain time (for instance, 90% and/or 110% of the initial performance indicator). A pre-defined indicator may also be a slope of the performance indicator over time.

In some embodiments, the status identifier 240 identifies the operating status of the geothermal energy system based on a comparison between performance indicators. For example, the status identifier 240 may identify the operating status of the geothermal energy system based on a comparison between performance indicators from different time segments. In some embodiments, the status identifier 240 identifies the operating status of the geothermal energy system based on a comparison between performance indicators from adjacent time segments. In some embodiments, the status identifier 240 identifies the operating status of the geothermal energy system based on a comparison of more than two performance indicators.

As a specific non-limiting example, the status identifier 240 may identify a decrease in the COP based on the calculated COP across two or more time segments. The status identifier 240 may determine that the operating status of the geothermal energy system is a reduced operating efficiency of the geothermal energy system.

In some embodiments, the geothermal management system 220 includes a system manager 242. The system manager 242 may, based on the operating status, prepare a recommendation. For example, the system manager 242 may prepare a recommendation to change an operating parameter of the geothermal energy system. The change in the operating parameter may be maintenance of a unit of equipment, adjustment of a flow rate, adjustment of any other parameter, and combinations thereof. In some embodiments, the system manager 242 automatically adjusts the operating parameter based on the identification of the operating status. In this manner, the operating efficiency of the geothermal energy system may be increased.

Conventionally, an operator may manually identify the operating status of the geothermal energy system by calculating performance indicators utilizing averages, rolling averages, weighted averages, or other averages. But average performance indicators are slow to respond to changes in the geothermal energy system. The techniques of the present disclosure may help to identify changes in the operating status as they happen by calibrating the physical model using operating parameters measured in the time segments. This may result in more responsive identification of the operating status. Identifying the operating status of the geothermal energy system may allow the operator to more quickly implement adjustments to the operating parameters, thereby improving efficiency of the geothermal energy system and/or reducing downtime of the geothermal energy system.

Figures 1, 3:
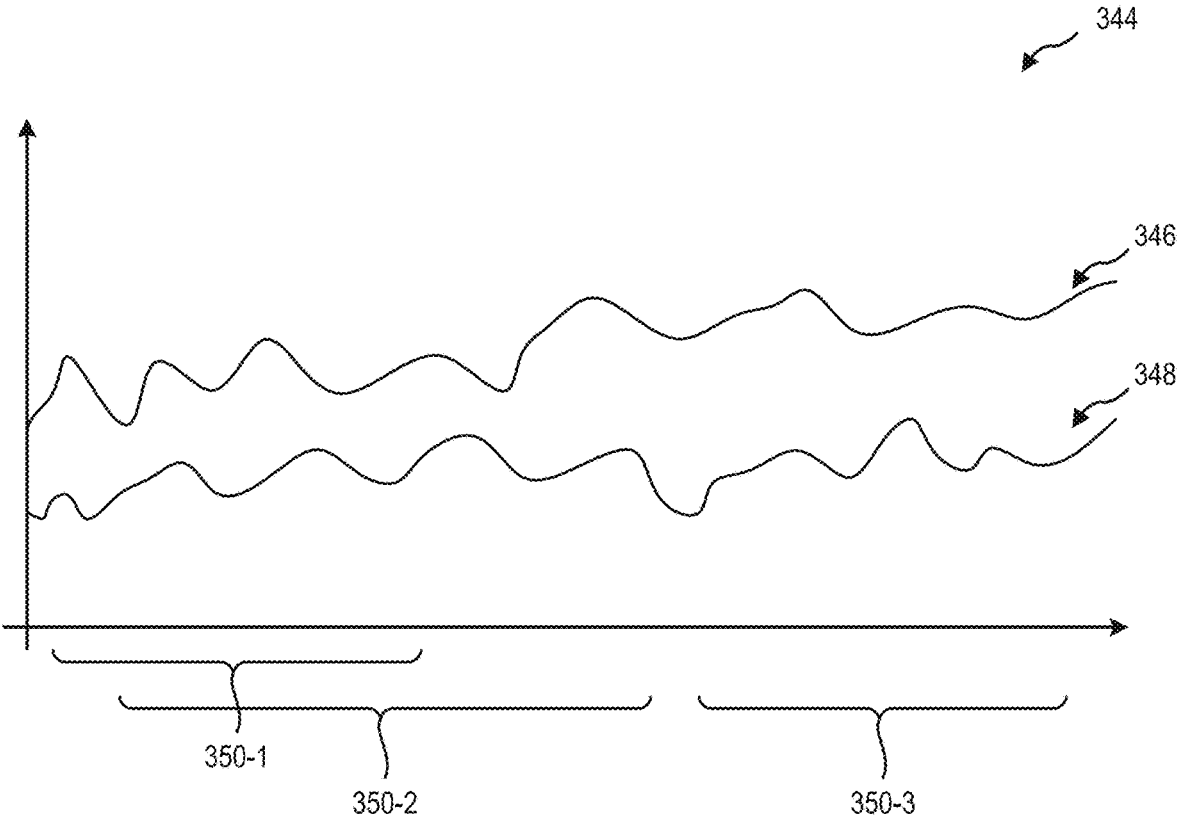
Figures 2, 3:
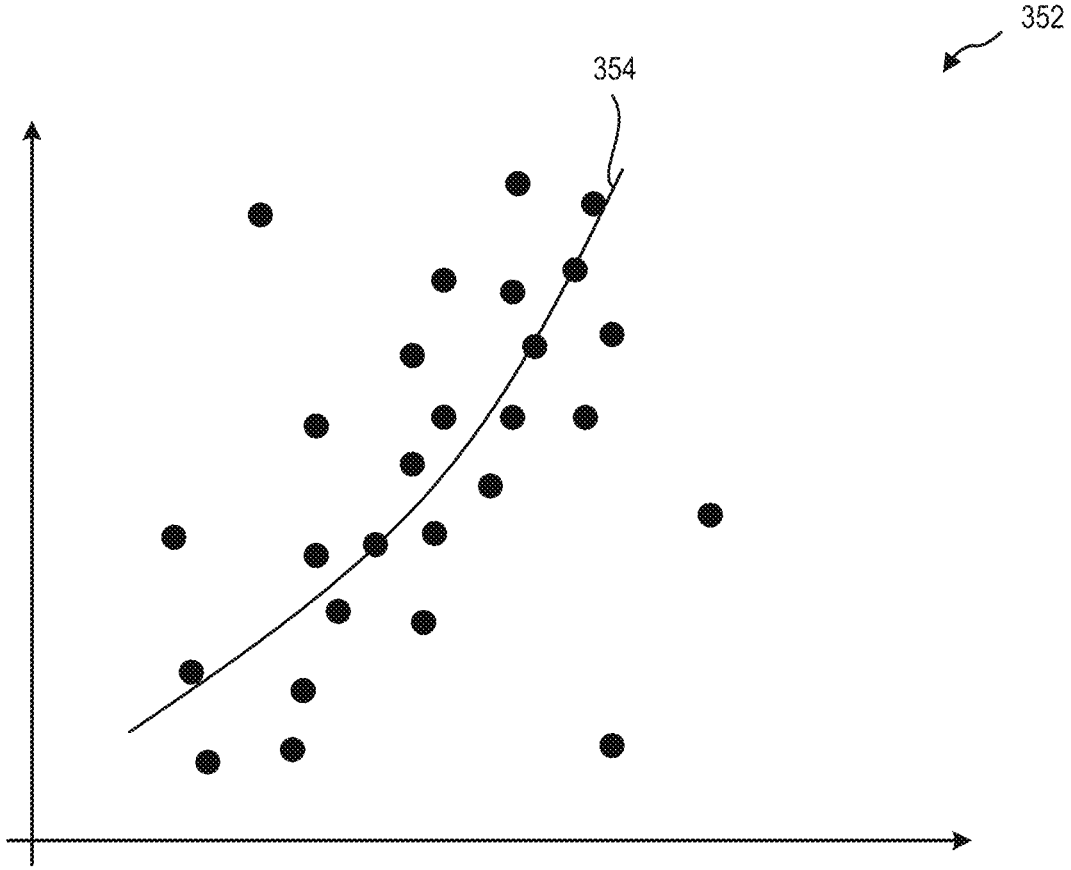
Figure 3:
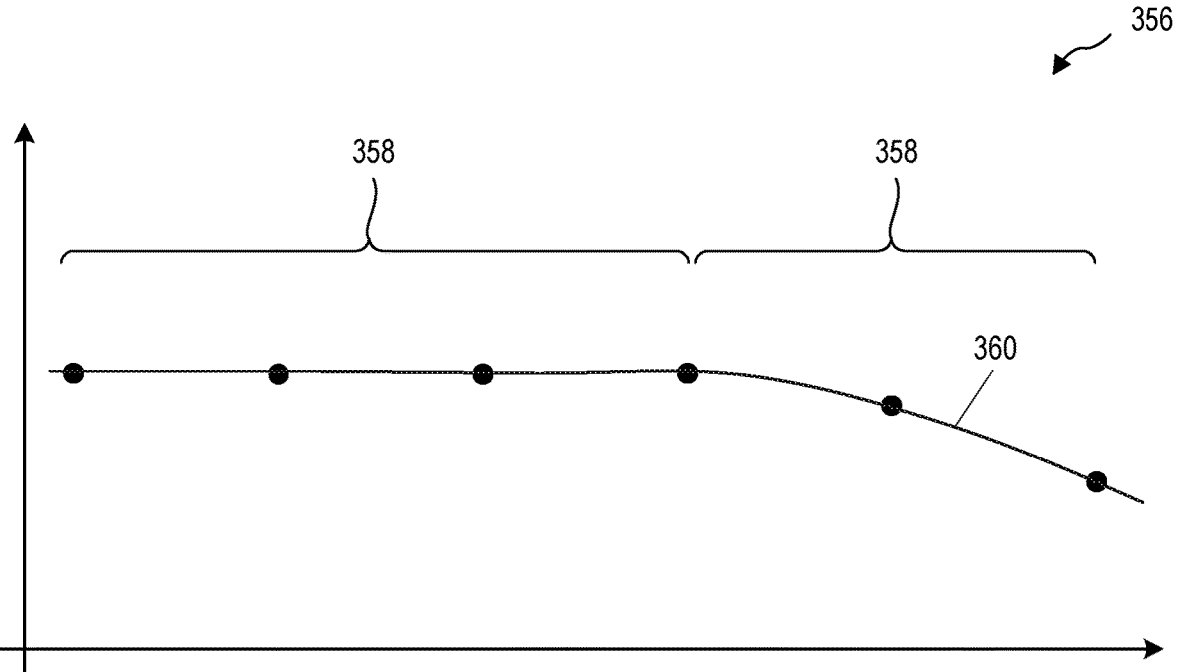

FIGS. 3-1, 3-2, and 3-3 are graphical representations of a geothermal management system, according to at least one embodiment of the present disclosure. In FIG. 3-1, a measurement plot 344 illustrates the collection of operating parameters from one or more sensors, with the measured parameter on the y-axis (e.g., vertical axis) and time on the x-axis (e.g., horizontal axis). As discussed herein, the geothermal management system may measure multiple parameters over time. As a specific, non-limiting example, the geothermal management system may measure (or infer) thermal energy transfer 346 and power consumption 348 over a total time period.

As discussed herein, a measurement segmenter may segment the measurements into multiple time segments (collectively 350). In FIG. 3-1, the measurement plot 344 has been separated into three time segments 350, a first time segment 350-1, a second time segment 350-2, and a third time segment 350-3. The first time segment 350-1 may cover a first time period, the second time segment 350-2 may cover a second time period, and the third time segment 350-3 may cover a third time period. In the embodiment shown, the first time segment 350-1 and the second time segment 350-2 overlap. The third time segment 350-3 does not overlap either the first time segment 350-1 or the second time segment 350-2. In some embodiments, the third time segment 350-3 may be adjacent to the second time segment 350-2. In some embodiments, there is a time gap between the second time segment 350-2 and the third time segment 350-3.

In the embodiment shown, the third time segment 350-3 has a different length or duration than the first time segment 350-1 and/or the second time segment 350-2. For example, the third time segment 350-3 is shorter than the first time segment 350-1 and the second time segment 350-2.

While FIG. 3-1 identifies three separate time segments 350, it should be understood that the measurement parameters may be separated into any number of time segments 350, any length of time segments 350, any amount of overlap of time segments 350, any other arrangement of time segments 350, and combinations thereof. The time segments 350 may all have the same length or duration, or different time segments 350 may have different lengths or durations.

In FIG. 3-2, a calibration plot 352 illustrates a scatter plot of a first operating parameter on the y-axis (e.g., vertical axis) and a second operating parameter on the x-axis (e.g., horizontal axis). The calibration plot 352 includes operating parameters measured during a particular time segment. The calibration plot 352 (or the data that is used to generate the calibration plot 352) may be used to calibrate one or more of the physical models. For example, a calibration curve 354 may be fit to the calibration plot 352. The equation of the calibration curve 354 may include the coefficients of the physical model. By inserting a pre-determined comparison parameter (i.e., a predetermined value of the second operating parameter) into the equation of the calibration curve 354, the geothermal management system may calculate the performance indicator.

As a specific non-limiting example, the two measured parameters illustrated on the calibration plot 352 include a COP determined on the y-axis (e.g., vertical axis) from a dT on the x-axis (e.g., horizontal axis). The resulting calibration curve 354 may be fit to a second-order polynomial equation, such as the function identified in Eq. 2. A pre-determined $dT_0$ may then be input into the equation for the calibration curve 354 to calculate the performance indicator.

Figures 3, 4:
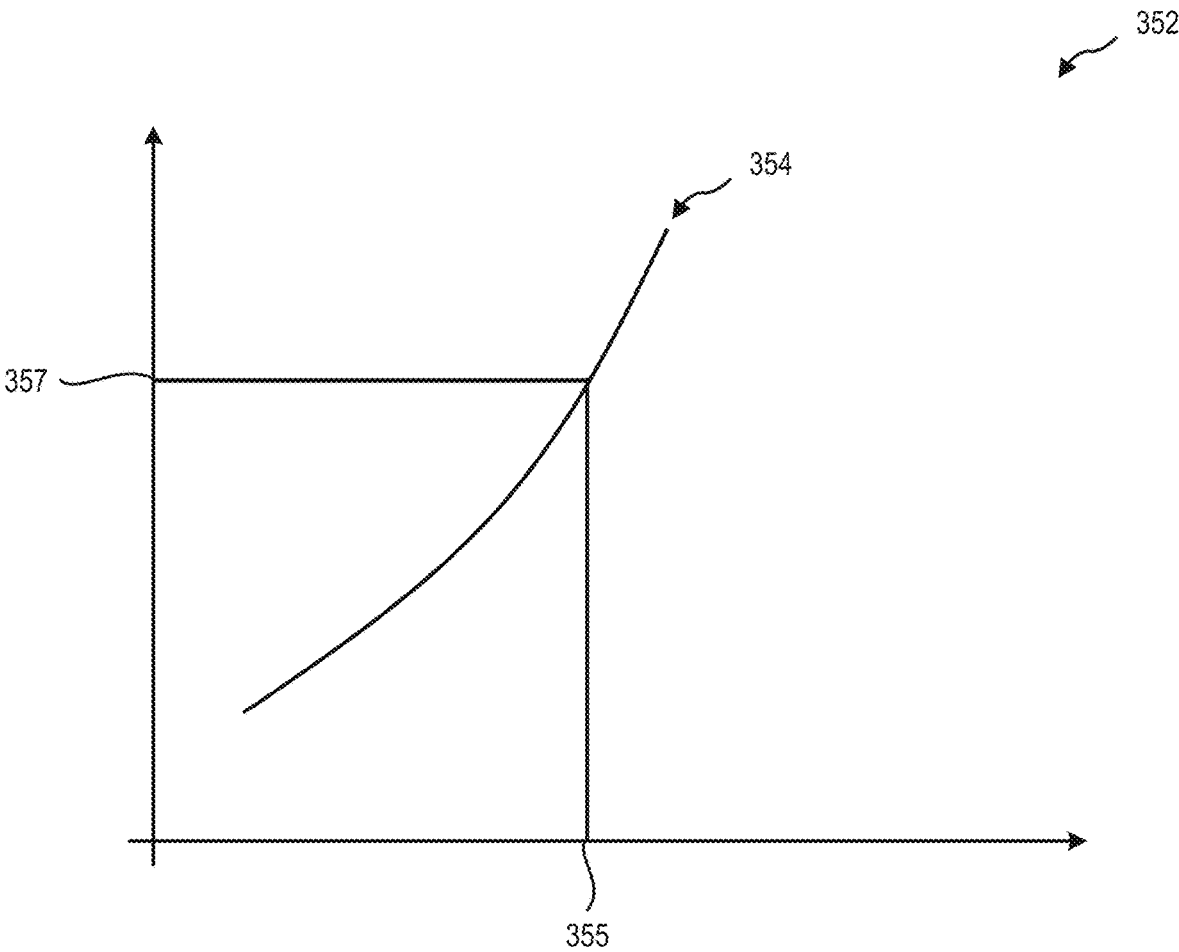
Figure 4:
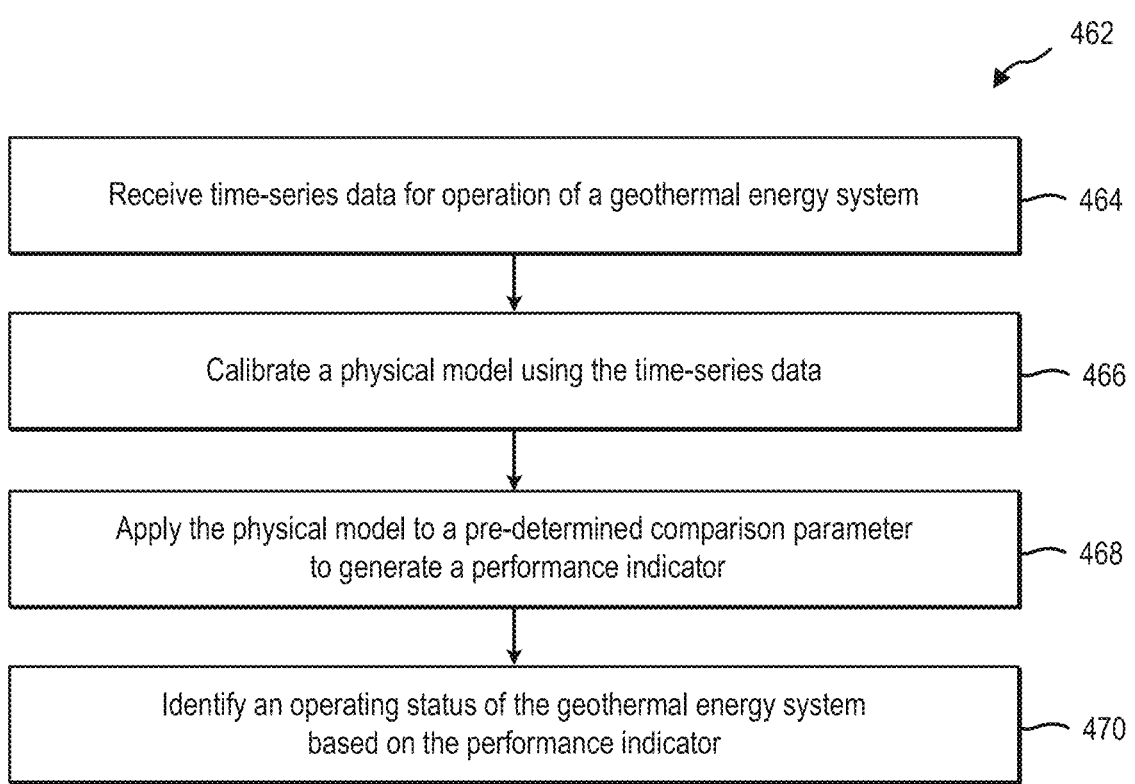

In FIG. 3-4, the calibration curve 354 is illustrated without the underlying datapoints. To determine the COP for the calibration curve 354, a pre-determined dT 355 may be applied to the calibration curve 354. As may be seen, as the pre-determined dT 355 is applied, a COP performance indicator 357 is generated. This COP performance indicator 357 may be used to determine the operating status of the geothermal energy system. In some embodiments, the COP performance indicator 357 is compared against other COP performance indicators generated from other calibration curves, and the comparison between COP performance indicators may provide the operator with a comparative indicator of the COP performance over time.

Of note, the calibration plot 352 does not include time as a variable. Put another way, the measured data plotted on the calibration plot 352 may include the measurements (and resulting calculated values) collected during the time segment, but the measurements (and resulting calculated values) may not be arranged, sequenced, or otherwise ordered by time.

While the above example is provided with respect to COP and dT, it should be understood that the calibration plot 352 and calibration curve 354 may be determined for any physical models relative to the geothermal system. For example, a physical model may determine pressure of a downhole fluid circulating in the borehole heat exchanger as a function of flowrate of said fluid, and the calibration plot 352 may include pressure differential on one axis, and flowrate on the other axis, with the resulting calibration plot 352 having a function that relates differential pressure to flowrate.

FIG. 3-3 is a representation of a performance indicator plot 356 with the performance indicator illustrated on the y-axis (e.g., vertical axis) and the time segment illustrated on the x-axis (e.g., horizontal axis). As may be seen, over a steady-state set 358 of time segments, the performance indicators indicate that the performance of the geothermal energy system is relatively steady. A decrease in the performance parameters over a decreasing set 360 of time segments may indicate a decrease in the operating efficiency of the geothermal energy system. The geothermal management system may determine the operating status based on the change in the performance indicators in the decreasing set, and provide an alert or otherwise change an operating parameter of the geothermal energy system.

Figure 5:
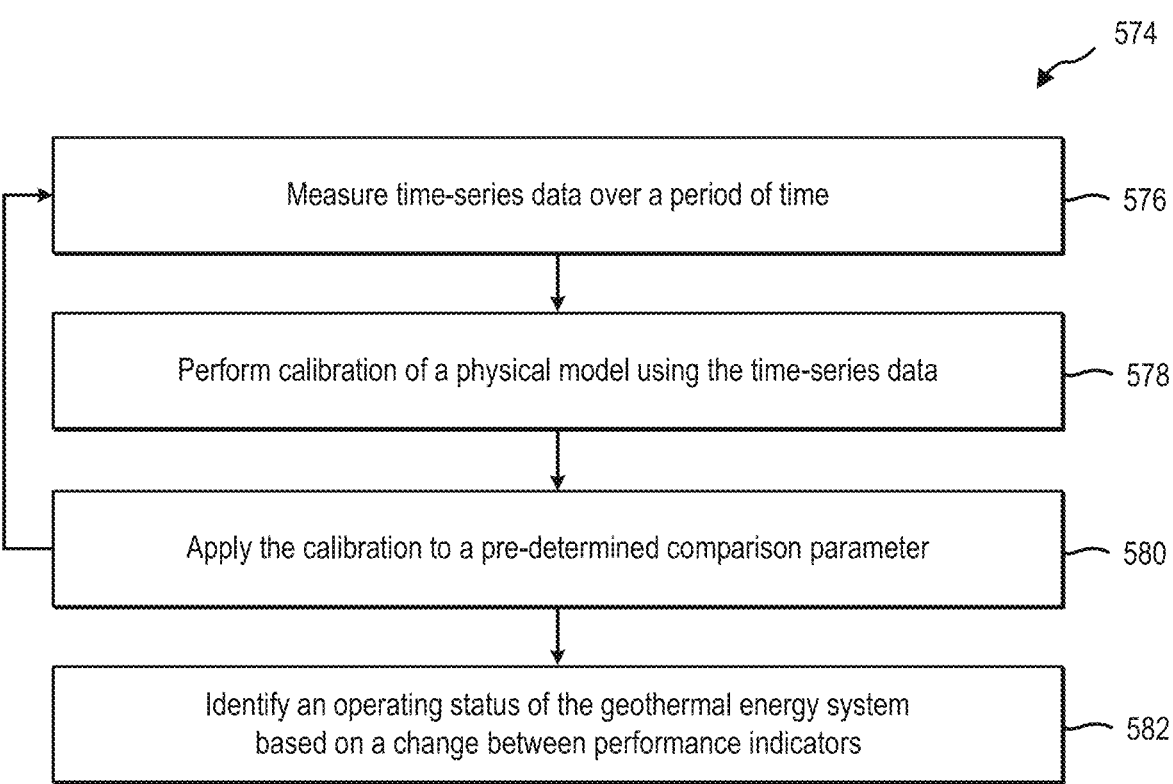
FIG. 5 is a flowchart of a method for managing a geothermal energy system, according to at least one embodiment of the present disclosure.

FIGS. 4 and 5, the corresponding text, and the examples provide a number of different methods, systems, devices, and computer-readable media of the geothermal energy system 100. In addition to the foregoing, one or more embodiments can also be described in terms of flowcharts comprising acts for accomplishing a particular result, as shown in FIGS. 4 and 5. FIGS. 4 and 5 may be performed with more or fewer acts. Additionally, the acts described herein may be repeated or performed in parallel with one another or parallel with different instances of the same or similar acts.

As mentioned, FIG. 4 illustrates a flowchart of a series of acts 462 or a method for managing a geothermal energy system, according to at least one embodiment of the present disclosure. While FIG. 4 illustrates acts according to one embodiment, alternative embodiments may omit, add to, reorder, and/or modify any of the acts shown in FIG. 4. The acts of FIG. 4 can be performed as part of a method. Alternatively, a computer-readable medium can comprise instructions that, when executed by one or more processors, cause a computing device to perform the acts of FIG. 4. In some embodiments, a system can perform the acts of FIG. 4.

A geothermal management system may receive time-series data for operation of a geothermal energy system at 464. As discussed herein, the time-series data may include any time-series data, including time-series data related to temperature, pressure, power consumption, flow rate, any other data, and combinations thereof. The geothermal management system may calibrate a physical model that models behavior of at least a portion of the geothermal system using the time-series data at 466. The physical model determines a value of a first operational parameter based on a second operational parameter. The geothermal management system may apply the physical model to a pre-determined comparison parameter (pre-determined value of the second operational parameter) to generate a performance indicator at 468 (value of the first operational parameter corresponding to the predetermined value of the second operational parameter in view of the physical model). The geothermal management system may identify an operating status of the geothermal energy system based on the performance indicator at 470.

As discussed herein, in some embodiments, the geothermal management system, based on the operating status, adjusts an operating parameter of the geothermal energy system to return the performance indicator within a certain range. Adjusting the operating parameter may include replacing a component of the geothermal energy system, placing the geothermal energy system in a troubleshooting mode, otherwise adjusting the operating parameters, and combinations thereof. In some embodiments, placing the geothermal energy system in a troubleshooting mode allows an operator to identify the underlying issue causing the change in operating status.

As discussed herein, the geothermal management system may split the time-series data into a plurality of time segments. In some embodiments, calibrating the physical model includes calibrating the physical model for each time segment of the plurality of time segments. In some embodiments, at least two of the plurality of time segments overlap. In some embodiments, the geothermal management system determines a performance indicator for each time segment. In some embodiments, identifying the operating status is based on a change in the performance indicators.

As mentioned, FIG. 5 illustrates a flowchart of a series of acts 574 or a method for managing a geothermal energy system, according to at least one embodiment of the present disclosure. While FIG. 5 illustrates acts according to one embodiment, alternative embodiments may omit, add to, reorder, and/or modify any of the acts shown in FIG. 5. The acts of FIG. 5 can be performed as part of a method. Alternatively, a computer-readable medium can comprise instructions that, when executed by one or more processors, cause a computing device to perform the acts of FIG. 5. In some embodiments, a system can perform the acts of FIG. 5.

A geothermal management system may measure time-series data over a period of time at 576. The geothermal management system may perform calibration of a physical model using the time-series data at 578. The geothermal management system may apply the model to a pre-determined comparison parameter to generate a performance indicator at 580. In accordance with at least one embodiment of the present disclosure, the geothermal management system repeats the acts of measuring, performing, and applying multiple times. For example, the geothermal management system 220 may measure first time-series data over a first period of time, perform a first calibration of the physical model using the first set of time-series data, and apply the first calibration to the pre-determined performance parameter to generate a first performance indicator. The geothermal management system 220 may then measure time-series data over a second period of time, perform a second calibration of the physical model using the second set of time-series data, and apply the second calibration to the pre-determined comparison parameter to determine a second performance indicator. This process may be repeated indefinitely. In some embodiments, the time periods are associated with different time-segments discussed herein. In some embodiments, the time periods partially overlap with each other.

The geothermal management system may identify an operating status of the geothermal energy system based on a change between the performance indicators at 582. For example, the geothermal management system may identify an operating status of the geothermal energy system based on a change between the first performance indicator and the second performance indicator.

Figure 6:
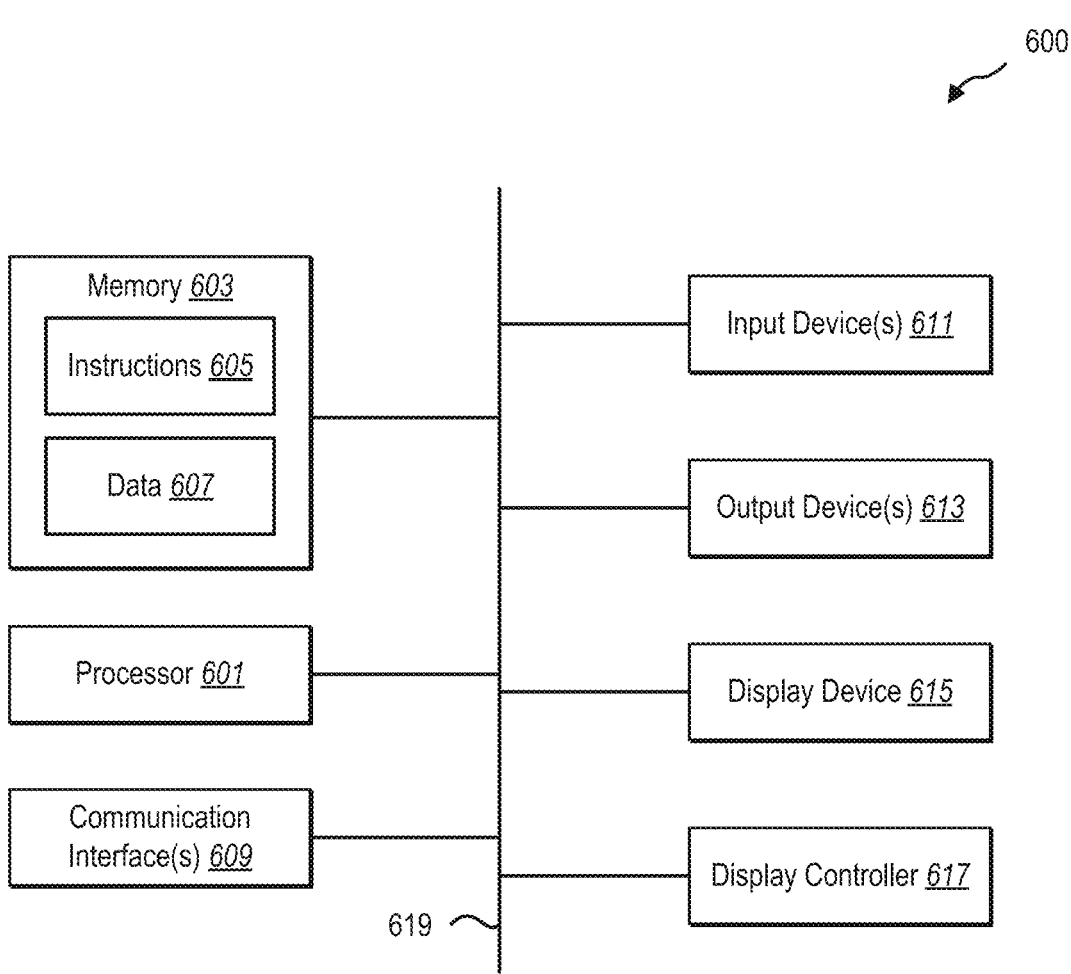
FIG. 6 is a schematic representation of a computing system, according to at least one embodiment of the present disclosure.

FIG. 6 illustrates certain components that may be included within a computer system 600. One or more computer systems 600 may be used to implement the various devices, components, and systems described herein.

The computer system 600 includes a processor 601. The processor 601 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

Following are sections in accordance with at least one embodiment of the present disclosure:

A1. A method for monitoring a status of at least a component of a geothermal energy system, the method comprising:

receiving time-series data for operation of the geothermal energy system and inferring at least a first and a second operational parameter of the geothermal energy system from the data;

calibrating a physical model of the first operational parameter as a function of a second operational parameter using the time-series data;

applying the physical model to a pre-determined value of the second operational parameter to generate a performance indicator; and identifying an operating status of the geothermal energy system based on the performance indicator.

A2. The method of section A1, further comprising, based on the operating status, adjusting an operating status of the geothermal energy system.

A3. The method of section A2, wherein adjusting the operating parameter includes replacing a component of the geothermal energy system.

A4. The method of section A2 or A3, wherein adjusting the operating parameter of the geothermal energy system includes placing the geothermal energy system in a troubleshooting mode.

A5. The method of any of sections A1 through A4, wherein identifying the operating status includes identifying the operating status based on a slope of a rate of change between a plurality of performance indicators.

A6. The method of any of sections A1 through A5, wherein identifying the operating status includes identifying the operating status based on a ratio of at least two performance indicators.

A7. The method of any of sections A1 through A6, wherein identifying the operating status includes identifying the operating status based on a comparison of one or more performance indicators with a threshold.

A8. The method of any of sections A1 through A7, wherein calibrating the physical model includes determining one or more coefficients for the physical model based on the time-series data.

A9. The method of any of sections A1 through A8, further comprising filtering the time-series data to a steady-state status.

A10. The method of any of claims A1 through A9, further comprising splitting the time-series data into a plurality of time segments.

A11. The method of section A10, wherein calibrating the physical model includes calibrating the physical model for each time segment of the plurality of time segments.

A12. The method of section A10 or A11, wherein at least two of the plurality of time segments are overlapping.

A13. The method of any of sections A1 through A12, wherein applying the physical model to the pre-determined comparison parameter to generate a performance indicator includes applying the physical model to the pre-determined value of the second operational parameter for each time segment of the plurality of time segments (350) to generate a plurality of performance indicators.

A14. The method of section A13, wherein identifying the operating status includes identifying the operating status based on a change in the plurality of performance indicators.

A15. The method of section A14, wherein identifying the operating status includes identifying the operating status by comparing the plurality of performance indicators for a single mode of operation.

A16. The method of any of sections A1 through A15, wherein the geothermal system includes a heat pump, wherein the first operational parameter is a coefficient of performance of the heat pump, and wherein the second operational parameter is a differential temperature of a working fluid of the heat pump.

A17. The method of any of sections A1 through A16, wherein the geothermal system includes a borehole heat exchanger, wherein the first operational parameter includes a pressure drop of a downhole fluid between inlet and outlet of the borehole, and the second operational parameter includes a flow rate of said downhole fluid.

A18. The method of any of sections A1 through A17, wherein the geothermal system includes a facility heating and/or cooling system, wherein the first operational parameter includes a pressure drop of a building fluid between inlet and outlet of the facility heating and/or cooling system, and the second operational parameter includes a flowrate of the building fluid.

B1. A method for monitoring a status of a geothermal energy system, the method comprising:

measuring a first set of time-series data over a first period of time for first and second operational parameters of the geothermal energy system;

performing a first calibration of a physical model using the first set of time-series data, the physical model being a model of the first operational parameter as a function of the second operational parameter;

applying the first calibration of the physical model to a pre-determined comparison value of the second operational parameter to generate a first performance indicator;

measuring a second set of time-series data over a second period of time for the first and second operational parameters of the geothermal energy system;

performing a second calibration of the physical model using the second set of time-series data;

applying the second calibration of the physical model to the pre-determined value to generate a second performance indicator; and identifying an operating status of the geothermal energy system based on a change between the first performance indicator and the second performance indicator.

B2. The method of B1, that comprises any features of the methods according to sections A2-A18.

The embodiments of the geothermal management system have been primarily described with reference to wellbore drilling operations; the geothermal management systems described herein may be used in applications other than the drilling of a wellbore. In other embodiments, geothermal management systems, according to the present disclosure, are used outside a wellbore or other downhole environment used for the exploration or production of natural resources. For instance, geothermal management systems of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for monitoring a status of at least a component of a geothermal energy system, the method comprising:
   receiving time-series data for operation of the geothermal energy system from a set of sensors, wherein the set of sensors comprises a temperature sensor, a power monitoring sensor, a flow rate sensor, and a pressure sensor, wherein the time-series data comprises temperature data from the temperature sensor, power data from the power monitoring sensor, flow rate data from the flow rate sensor, and pressure data from the pressure sensor;
   filtering the time-series data to obtain filtered time-series data;
   calibrating a model by fitting a set of coefficients of the model to the filtered time-series data, wherein the model emulates a behavior of the component using the filtered time-series data;
   inferring at least a first operational parameter and a second operational parameter of the geothermal energy system from the filtered time-series data, wherein the model infers the first operational parameter based on the second operational parameter;
   applying the model to a pre-determined comparison value of the second operational parameter to generate a performance indicator comprising a predicted value of the first operational parameter at the pre-determined comparison value;
   identifying an operating status of the geothermal energy system based on the performance indicator, wherein the operating status specifies a maintenance status of the component; and
   generating a recommendation based on the operating status, wherein the recommendation specifies adjusting the first operational parameter.

2. The method of claim 1, further comprising, based on the recommendation, adjusting the first operational parameter of the geothermal energy system to return the system within a threshold.

3. The method of claim 2, wherein adjusting the first operational parameter includes replacing the component of the geothermal energy system.

4. The method of claim 2, wherein adjusting the first operational parameter of the geothermal energy system includes placing the geothermal energy system in a troubleshooting mode.

5. The method of claim 1, wherein identifying the operating status includes identifying the operating status based on a slope of a rate of change between a plurality of performance indicators.

6. The method of claim 1, wherein identifying the operating status includes identifying the operating status based on a ratio of the performance indicator and a second performance indicator.

7. The method of claim 1, wherein identifying the operating status includes identifying the operating status based on a comparison of the performance indicator with a threshold.

8. The method of claim 1, further comprising:
   splitting the time-series data into a plurality of time segments.

9. The method of claim 8, wherein calibrating the model further includes calibrating the model for each time segment of the plurality of time segments.

10. The method of claim 8, wherein at least two of the plurality of time segments are overlapping.

11. The method of claim 8, wherein generating the performance indicator includes applying the model to the pre-determined comparison value of the second operational parameter for each time segment of the plurality of time segments to generate a plurality of performance indicators.

12. The method of claim 11, wherein identifying the operating status includes identifying the operating status based on a change in the plurality of performance indicators.

13. The method of claim 12, wherein identifying the operating status includes identifying the operating status by comparing the plurality of performance indicators for a single mode of operation.

14. The method of claim 1, wherein the geothermal system includes a heat pump, wherein the first operational parameter is a coefficient of performance of the heat pump, and wherein the second operational parameter is a differential temperature of a working fluid of the heat pump.

15. The method of claim 1, wherein the geothermal system includes a borehole heat exchanger, wherein the first operational parameter includes a pressure drop of a downhole fluid between inlet and outlet of the borehole heat exchanger, and the second operational parameter includes a flow rate of said downhole fluid.

16. The method of claim 1, wherein the geothermal system includes a facility heating and/or cooling system, wherein the first operational parameter includes a pressure drop of a building fluid between inlet and outlet of the facility heating and/or cooling system, and the second operational parameter includes a flow rate of the building fluid.

17. A method for monitoring a status of a geothermal energy system, the method comprising:
   measuring a first set of time-series data over a first period of time for a first operational parameter and a second operational parameter of the geothermal energy system, wherein the first set of time-series data is measured using a set of sensors, wherein the set of sensors comprises a temperature sensor, a power monitoring sensor, a flow rate sensor, and a pressure sensor, wherein the first set of time-series data comprises temperature data from the temperature sensor, power data from the power monitoring sensor, flow rate data from the flow rate sensor, and pressure data from the pressure sensor;

filtering the first set of time-series data to obtain a filtered first set of time-series data;

performing a first calibration of a model by fitting a set of coefficients of the model to the filtered first set of time-series data, wherein the model emulates a behavior of a component of the geothermal energy system using the filtered first set of time-series data, wherein the first operational parameter is inferred based on the second operational parameter;

applying the first calibration of the model to a pre-determined comparison value of the second operational parameter to generate a first performance indicator comprising a predicted value of the first operational parameter at the pre-determined comparison value;

measuring a second set of time-series data over a second period of time for the first operational parameter and the second operational parameter;

performing a second calibration of the model by fitting the set of coefficients of the model to the second set of time-series data;

applying the second calibration of the model to the pre-determined comparison value to generate a second performance indicator;

identifying an operating status of the geothermal energy system based on a change between the first performance indicator and the second performance indicator, wherein the operating status specifies a maintenance status of the component; and generating a recommendation based on the operating status, wherein the recommendation specifies adjusting the first operational parameter.

18. The method of claim 17, further comprising:

splitting the time-series data into a plurality of time segments, wherein at least two of the plurality of time segments are overlapping.

* * * * *